United States Patent
Rahm

(10) Patent No.: US 12,546,275 B2
(45) Date of Patent: Feb. 10, 2026

(54) COMBUSTION ENGINE ARRANGEMENT AND METHOD

(71) Applicant: VOLVO TRUCK CORPORATION, Gothenburg (SE)

(72) Inventor: Fredrik Rahm, Hörby (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 18/720,361

(22) PCT Filed: Dec. 16, 2021

(86) PCT No.: PCT/EP2021/086177
§ 371 (c)(1),
(2) Date: Jun. 14, 2024

(87) PCT Pub. No.: WO2023/110104
PCT Pub. Date: Jun. 22, 2023

(65) Prior Publication Data
US 2025/0067233 A1 Feb. 27, 2025

(51) Int. Cl.
*F02M 26/08* (2016.01)
*F02B 37/04* (2006.01)
(Continued)

(52) U.S. Cl.
CPC .............. *F02M 26/08* (2016.02); *F02B 37/04* (2013.01); *F02B 43/10* (2013.01); *F02M 26/34* (2016.02)

(58) Field of Classification Search
CPC ........ F02M 26/08; F02M 26/05; F02M 26/34; F02M 35/10157; F02M 35/10222;
(Continued)

(56) References Cited

U.S. PATENT DOCUMENTS 6,164,071 A * 12/2000 Shao ...................... F02M 26/40
123/568.21
8,806,869 B2 * 8/2014 Petrovic ................ F02B 37/013
123/562
(Continued)

FOREIGN PATENT DOCUMENTS

DE 102020100529 A1 * 7/2021
EP 3112641 A1 1/2017
(Continued)

OTHER PUBLICATIONS

International Search Report and Written Opinion of the International Searching Authority in corresponding International Application No. PCT/EP2021/086177 dated Aug. 23, 2022 (11 pages).
(Continued)

*Primary Examiner* — Grant Moubry
(74) *Attorney, Agent, or Firm* — Jeffri A. Kaminski; Venable LLP

(57) ABSTRACT

A combustion engine arrangement comprising a combustion engine has an intake manifold, and an exhaust manifold the combustion engine arrangement comprising a turbocharged air intake system fluidly connected to said intake manifold. The turbocharged air intake system has an air pump; and an exhaust gas recirculation (EGR) system fluidly connecting said exhaust manifold to said intake manifold, the EGR system comprising an EGR pump. The EGR pump and the air pump are arranged to be independently controllable so as to enable independent control the exhaust gas inflow and the air inflow to the intake manifold of the combustion engine.

13 Claims, 2 Drawing Sheets

(51) Int. Cl.
*F02B 43/10* (2006.01)
*F02M 26/34* (2016.01)

(58) Field of Classification Search
CPC .......... F02B 37/04; F02B 37/12; F02B 43/10; F02D 41/0007; F02D 23/00
See application file for complete search history.

(56) References Cited

U.S. PATENT DOCUMENTS

| | | | |
|---|---|---|---|
| 11,536,213 B2* | 12/2022 | Miles | F02M 26/13 |
| 11,591,992 B2* | 2/2023 | Haaland | F02M 35/10222 |
| 2005/0011184 A1* | 1/2005 | Price | F02B 37/164 60/289 |
| 2014/0373816 A1* | 12/2014 | Nagar | F02D 41/0072 123/51 B |
| 2019/0345857 A1* | 11/2019 | Rollinger | F01N 3/30 |
| 2020/0309059 A1* | 10/2020 | Hotta | F02B 37/18 |
| 2022/0349365 A1* | 11/2022 | Haaland | F01N 3/32 |

FOREIGN PATENT DOCUMENTS

| | | | | | |
|---|---|---|---|---|---|
| GB | 2489415 A | | 10/2012 | | |
| GB | 2590942 A | * | 7/2021 | .............. | F02B 37/04 |
| WO | 2014107407 A1 | | 7/2014 | | |
| WO | 2020052735 A1 | | 3/2020 | | |

OTHER PUBLICATIONS

International Preliminary Report on Patentability in corresponding International Application No. PCT/EP2021/086177 mailed Mar. 25, 2024 (6 pages).

\* cited by examiner

COMBUSTION ENGINE ARRANGEMENT AND METHOD

CROSS-REFERENCE TO RELATED APPLICATIONS

This application is a U.S. National Stage application of International Application No. PCT/EP2021/086177, filed Dec. 16, 2021 and published on Jun. 22, 2023 as WO 2023/110104, all of which is hereby incorporated by reference in its entirety.

TECHNICAL FIELD

The invention relates to a combustion engine arrangement comprising a combustion engine and comprising a turbocharged air intake system and an exhaust gas recirculation system. The invention further relates to a method for controlling such a combustion engine arrangement.

The invention can be applied in heavy-duty vehicles, such as trucks, buses and construction equipment, as well as lighter vehicles such as passenger cars. Although the invention will be described with respect to a truck, the invention is not restricted to this particular vehicle, but may also be used in other vehicles such as passenger cars.

BACKGROUND

With the development of new combustion engine arrangements for vehicles, such as in heavy-duty vehicles, there is a desire to use hydrogen as fuel, either as the only fuel for a pure hydrogen combustion engine, or as one of the fuels in a dual fuel engine.

However, due to the low ignition energy of hydrogen, combustion engines using hydrogen as a fuel may be subject to abnormal combustion, such as backfiring, pre-ignition, and knocking. This is particularly the case for spark ignited internal combustion engines.

To reduce knock, dilution of the combustible fuel mixture can be realized by exhaust gas recirculation (EGR). However, highly diluted fuel mixture may limit the potential power output from the combustion engine arrangement.

Another present solution is to retard the ignition timing in combination with reducing the load. This implies however a substantial reduction in power output.

In view of the above, there is a desire to provide a solution for a combustion engine arrangement, which can reduce the risk for abnormal combustion, such as reduce the risk for knock. Further, there is a desire to provide such a solution which can reduce the risk for abnormal combustion, such as reducing the risk for knock, in a hydrogen engine, i.e. an engine which is adapted to wholly or partly to use hydrogen as a fuel.

SUMMARY

The object of the invention is to provide an alternative or an improvement in view of one or more of the above-mentioned needs.

According to a first aspect of the invention, at least one of the objects is achieved by a combustion engine arrangement according to claim 1.

Thus, there is provided a combustion engine arrangement comprising a combustion engine having an intake manifold, and an exhaust manifold. The combustion engine arrangement comprises a turbocharged air intake system fluidly connected to said intake manifold, which turbocharged air intake system comprises an air pump. The combustion engine arrangement further comprises an exhaust gas recirculation (EGR) system fluidly connecting said exhaust manifold to said intake manifold, which EGR system comprises an EGR pump.

Further, the EGR pump and the air pump are arranged to be independently controllable so as to enable independent control of the exhaust gas inflow and the air inflow to the intake manifold of the combustion engine.

As such, there is provided a combustion engine arrangement having a turbocharged air intake system to the intake manifold of a combustion engine, and an EGR system enabling recycling of exhaust gas from the exhaust manifold of a combustion engine to the intake manifold.

Further, to control the intake of air and of exhaust gas, the air intake system comprises an air pump, and the exhaust gas recirculation system comprises an EGR pump.

The EGR pump and the air pump are arranged to be independently controllable so as to enable independent control of the exhaust gas inflow and the air inflow to the intake manifold of the combustion engine.

By virtue of the EGR pump and the air pump being arranged to be independently controllable, a precise control of the air intake and the exhaust gas intake into the combustion engine is enabled. As such, parameters such as mass, temperature, pressure and gas composition in the cylinders of the combustion engine may be more accurately controlled, which increases the possibilities of avoiding abnormal combustion such as knock.

With the increased possibilities of avoiding abnormal combustion such as knock, the combustion engine arrangement as proposed in the above may be adapted to use hydrogen as fuel.

Further, the provision of the EGR pump may reduce the back pressure of the combustion engine, i.e. of the combustion engine cylinders, which may improve cylinder expansion and thus contribute to a higher engine efficiency.

With fully independent control of exhaust gas recycling and air flow variability, optimum air/exhaust gas content to the intake manifold, i.e. air/fuel and water content in the combustion chamber, may be achieved.

As such, by provision of the independently controllable air pump and EGR pump, fast and accurate control at all operating points of the combustion engine system may be achieved for air mass flow and exhaust gas mass flow. Further, the power potential for the combustion engine system may be extended, and efficiency and robustness may be improved. Further, NOX emission control may be improved, especially in transient operation, which in turn may allow for further improvements as regards exhaust aftertreatment, such as the Exhaust Aftertreatment System (EATS) dimensioning and/or control.

The EGR pump and/or the air pump may be arranged to be speed controlled, i.e. the pump or pumps may be arranged to be controlled by controlling the number of revolutions per minute (rpm) of the pump.

Optionally, said EGR pump is a displacement pump. Optionally, the air pump is a displacement pump. For example, the EGR pump and the air pump may both be displacement pumps.

With displacement pump is meant herein a displacement type pump without internal compression. A displacement pump may be suitable to achieve the desired accurate control of the air inflow and/or exhaust gas inflow.

Further, in displacement pumps, closed volumes provide for the flow through the pumps, meaning that no flow is allowed to go backwards through the pumps. As such, the displacement pumps act like flame arrestors in case of backfire from the combustion engine.

Optionally, the combustion engine is a spark ignition combustion engine, such as a spark ignition hydrogen combustion engine.

Alternatively, said combustion engine is a compression ignition combustion engine, such as a dual fuel compression ignition combustion engine wherein one of the fuels is hydrogen.

Optionally, the combustion engine is a port injection engine. For a port injection engine, the advantage mentioned in the above of the pumps hindering backfire may be of particular benefit. As such, the volume available to burn in the case of back firing at the inlet of the combustion engine may be reduced.

Alternatively, said combustion engine is a direct injection engine. For a direct injection engine, the accurate control may be particularly beneficial in enabling control of the intake valve closure after start of fuel injection, such as after start of hydrogen injection, in particular in high load conditions.

Optionally, said EGR pump and/or said air pump are located immediately upstream the intake manifold.

With "immediately" upstream is meant that no other components are arranged between the respective pump and the intake manifold. Piping may of course be arranged to ensure fluid flow between the respective pump and the intake manifold. However, it may be preferred that such piping is kept as short as possible. This is beneficial to the responsivity of the engine system when controlling the air pump and the EGR pump.

Further, the volume available to burn in the case of back firing at the inlet of the combustion engine may be reduced.

Optionally, the EGR pump and/or the air pump are arranged to be electrically driven. As such, swift and accurate control of the pumps, such as control of the speed of the pumps may be obtained by electrical control of the electrically driven pumps.

Alternatively, however, the EGR pump and/or the air pump may be arranged to be mechanically driven. In another alternative, the EGR pump and/or the air pump may be arranged to be hydraulically driven.

Optionally, said EGR system comprises a bypass path bypassing the EGR pump. The bypass path may comprise a bypass valve. As such, the bypass valve may be arranged to be controllable so as to enable control of the exhaust gas intake by means of controlling the EGR pump in combination with the bypass valve.

Optionally, the EGR system comprises an EGR valve arranged for controlling the intake of exhaust gas from the exhaust manifold to the EGR system.

Thus, the bypass path and/or the EGR valve may be controllable in combination with the EGR pump for controlling the amount of exhaust gas from the exhaust manifold which is to be recycled to the intake manifold.

In a second aspect, the invention relates to a method for controlling a combustion engine arrangement according to the first aspect. As such, there is provided a method according to claim 11.

Thus, there is provided a method comprising independently controlling said EGR pump and said air pump so as to independently control the exhaust gas inflow and the air inflow to the intake manifold of the combustion engine.

Optionally, the method comprises determining a low air demand condition of the engine, and for a duration of said low air demand condition, throttling said air pump while recovering energy. Thus, energy may be recovered from the boost pressure flow from the turbo.

As such, in low air demand conditions, the air pump may be used for recovering energy. The recovered energy may be stored, for example in a battery.

Optionally, the method comprises determining a low EGR demand condition of the engine, and, for a duration of said low EGR demand condition, throttling said EGR pump while recovering energy from said EGR pump.

As such, in low EGR demand conditions, the EGR pump may be used for recovering energy. The recovered energy may be stored, for example in a battery.

In a third aspect, there is provided a control unit for operating a combustion engine arrangement in accordance with the first aspect, wherein the control unit is configured to perform the method according to the second aspect.

In a fourth aspect, there is provided a vehicle comprising the combustion engine arrangement according to the first aspect, and/or a control unit according to the third aspect.

Features and advantages as described in relation to any one of the aspects in the above are equally applicable to the other aspects.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
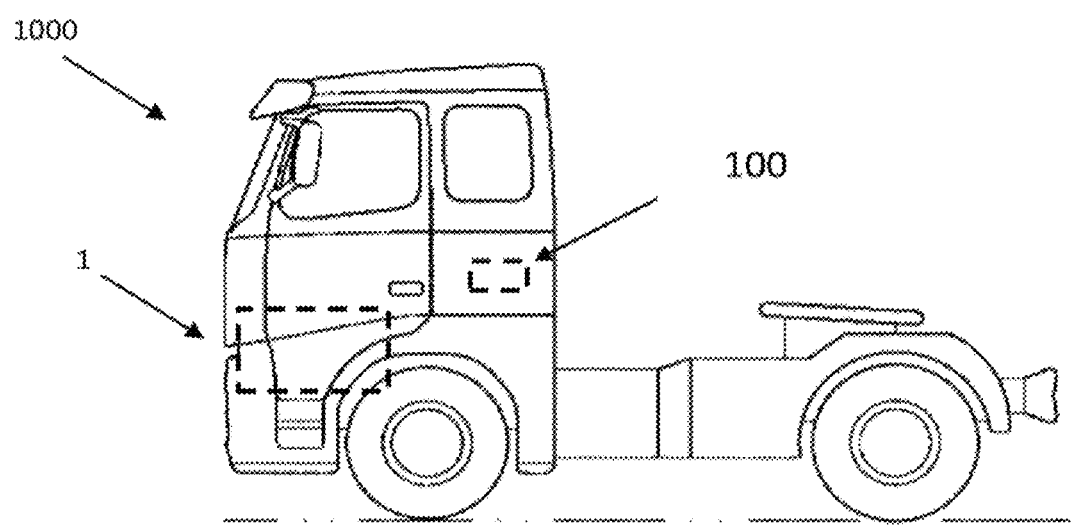
FIG. 1 is a side view of a vehicle according to an example embodiment of the invention.

FIG. 1 depicts a side view of a vehicle 1000 according to an example embodiment of the invention. The vehicle 1000 is here a truck, more specifically a heavy-duty truck for towing one or more trailers (not shown). Even though a heavy-duty truck 1000 is shown it shall be noted that the invention is not limited to this type of vehicle but may be used for any other type of vehicle, such as a bus, construction equipment, e.g. a wheel loader or an excavator, or a passenger car. The invention is also applicable for other applications not relating to vehicles such as stationary engines, e.g. genets.

The vehicle 1000 comprises a combustion engine arrangement 1. The combustion engine arrangement 1 is used for creating a propulsion force to the vehicle 1000.

The vehicle 1000 further comprises a control unit 100 according to an example embodiment of the invention. The control unit 100 is thus used for operating the vehicle arrangement 1. Even though an on-board control unit 100 is shown, it shall be understood that the control unit 100 could also be a remote-control unit 100, i.e., an off-board control unit, or a combination of an on-board and off-board control unit. The control unit 100 may be configured to control the vehicle arrangement 1 by issuing control signals and by receiving status information relating to the vehicle arrangement 1.

The control unit 100 is an electronic control unit and may comprise processing circuitry which is adapted to run a computer program as disclosed herein. The control unit 100 may comprise hardware and/or software for performing the method according to the invention. In an embodiment the control unit 100 may be denoted a computer. The control unit 100 may be constituted by one or more separate sub-control units. In addition, the control unit 100 may communicate by use of wired and/or wireless communication means.

Figure 2:
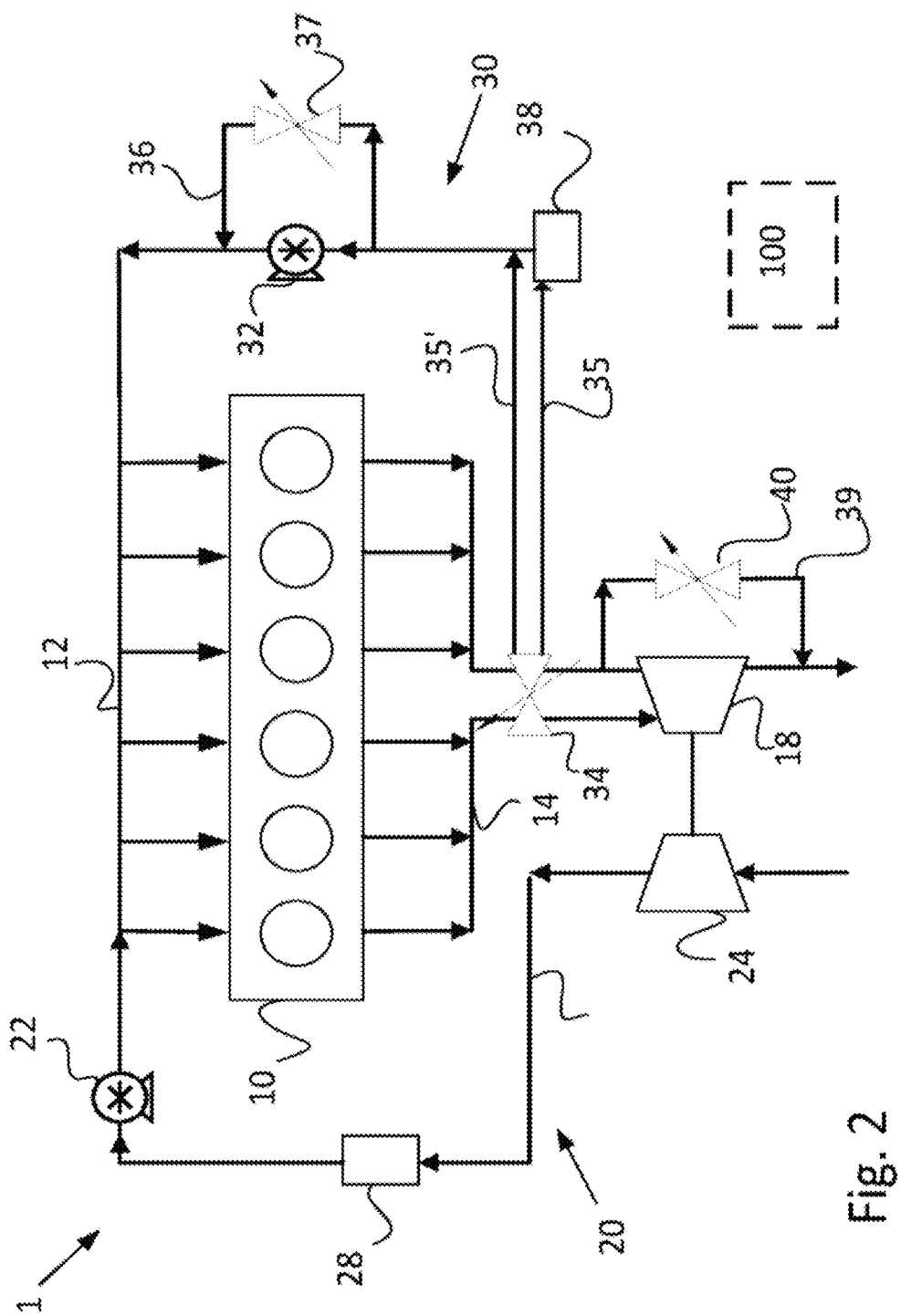
FIG. 2 is a schematic view of a combustion engine arrangement, according to an example embodiment of the first aspect of the invention.

FIG. 2 depicts a schematic illustration of a combustion engine arrangement 1 according to an example embodiment of the invention.

The combustion engine arrangement 1 comprises a combustion engine 10. As such, the combustion engine may be any type of combustion engine 10 which may be subject to abnormal combustion such as knock. As such, the combustion engine 10 may be an engine adapted for hydrogen fuel, such as a pure hydrogen engine or a dual fuel engine where hydrogen is one of the intended fuels. To this end, is envisaged that the combustion engine may be a compression ignition combustion engine, for example a compression ignition combustion engine being a dual fuel compression ignition combustion engine wherein one of the fuels are hydrogen.

However, the combustion engine arrangement 1 may preferably be a spark ignition combustion engine, such as a spark ignition hydrogen combustion engine. It is envisaged that the solution as proposed herein may be particularly useful for spark ignition combustion engines, especially spark ignition combustion engines adapted for using hydrogen as fuel, so as to avoid or diminish abnormal combustion within such engines.

In some variants, the spark ignition combustion engine may be a port injection engine.

In some variants, the spark ignition combustion engine may be a direct injection engine.

When using a direct injection engine, for example with hydrogen fuel, the provision of the air pump provides for a diminished or removed risk for backfire during late closing of the air intake valves e.g. close after start of hydrogen injection in high load situations.

Thus, there is provided combustion engine arrangement 1 comprising a combustion engine 10 having an intake manifold 12, and an exhaust manifold 14.

FIG. 2 illustrates a variant of the combustion engine arrangement 1 proposed herein, comprising a combustion engine 10 having an intake manifold 12 and an exhaust manifold 14.

The combustion engine arrangement comprises an air intake system 20 fluidly connected to the intake manifold 12. The air intake system is a turbocharged air intake system. Thus, as illustrated in FIG. 2, a compressor 24 is arranged upstream the intake manifold 12, the compressor 24 being mechanically connected to a turbine 18 arranged downstream the exhaust manifold 14. As such, energy from the exhaust gases emerging from the exhaust manifold 14 is used for driving the compressor 24 to provide boost pressure to the intake air.

Purely as an example, and as illustrated in FIG. 2, the air intake system 20 may further comprise a charge air cooler 28 arranged downstream the compressor 24 and upstream the air intake manifold 12, to cool the intake air after passage through the compressor 24, and before reaching the combustion engine 10.

The combustion engine arrangement 1 further comprises an exhaust gas recirculation (EGR) system 30 fluidly connecting the exhaust manifold 14 of the combustion engine 10 to the intake manifold 12. The exhaust gas recirculation system 30 may be connected to an exhaust path of the combustion engine arrangement 1 downstream the exhaust manifold 14, and upstream the turbine 18. A controllable exhaust gas recirculation (EGR) valve 34 may be provided to enable control of the amount of exhaust gas entering the EGR system 30 from the exhaust manifold 14.

Optionally, and as illustrated in the example of FIG. 2, the EGR system 30 may comprise an EGR cooler 38 arranged downstream the exhaust manifold 14 and upstream the intake manifold 12, for cooling the exhaust gas in the EGR system 30 before entering the intake manifold 12. Purely as an example, and as illustrated in FIG. 2, the combustion engine arrangement 1 may further comprise a first path 35 enabling exhaust gas to circulate from the exhaust manifold 14, via the EGR valve 34 to the EGR cooler 38 and further towards the intake manifold 12 of the combustion engine 10. As such, the exhaust gas may be cooled by passage through the EGR cooler 38 before introduction into the intake manifold 12. Purely as an example, and as also illustrated in FIG. 2, the combustion engine arrangement 1 may in addition comprise a second path 35' enabling exhaust gas to circulate from the exhaust manifold 14, via the EGR valve 34 and further towards the intake manifold 12 of the combustion engine 10 without passing the EGR cooler 38. As such, relatively hot, non-cooled exhaust gas may also be introduced into the intake manifold. By controlling the proportion of exhaust gas flowing through the EGR cooling 38 via the first path 35, and the proportion of exhaust gas flowing via the second path 35', for example via the EGR valve 34, there is provided a possibility to control the temperature of the exhaust gas entering the intake manifold 12. For example, the temperature of the exhaust gas entering the intake manifold 12 may be controlled to be relatively high in situations such as at cold start of the engine. Further, controlling the temperature of the exhaust gas entering the intake manifold 12 allows for control of the condensation of the water content in the exhaust gas. In particular when H2 is used as fuel, the exhaust gas may comprise relatively large amount of water, which is why the control of the condensation of the water content may be particularly useful.

Optionally, and as illustrated in the example of FIG. 2, the engine system 1 may comprise a turbine by-pass path 39, enabling exhaust gas from the exhaust manifold 14 to bypass the turbine 18. As such, the turbine by-pass path 39 may be arranged to allow exhaust gas flow from a location in the exhaust path of the combustion engine 1 upstream the turbine 18 to a location downstream the turbine 18. The turbine by-pass valve 39 may comprise a turbine by-pass valve 40, arranged to be controllable so as to control the amount of exhaust gas bypassing the turbine 18. For example, control of the turbine by-pass valve 39 may be made so as to control the speed of the compressor 24 of the intake system 20, e.g. to avoid overspeed of the compressor 24.

Further, as illustrated in FIG. 2, the air intake system 20 comprises an air pump 22; and the EGR system 30 comprises an EGR pump 32. Further, the EGR pump 32 and the air pump 22 are arranged to be independently controllable so as to enable independent control of the exhaust gas inflow and the air inflow to the intake manifold 12 of the combustion engine 10. As such, the air intake as well as the exhaust gas intake to the intake manifold 12 may be independently controllable so as to avoid abnormal combustion such as knock in the combustion engine 1.

By "independently controllable" is understood that the air pump 22 is controllable by setting a control parameter to a value which may be freely selected, independent of the control of the EGR pump. Similarly, the EGR pump 32 is controllable by setting a control parameter to a value which may be freely selected, independent of the control of the air pump. However, this does not hinder that the determination of the value to which the parameter shall be set for one pump is calculated using input comprising information concerning the other pump e.g. information regarding a present air intake or exhaust gas intake.

For example, the air pump 22 and the EGR pump 32 may be controllable by setting a control parameter corresponding to the rotation speed of either pump 22, 32, i.e. each pump 22, 32 may be controlled to achieve a desired rotation speed, for example as expressed in rpm.

It is envisaged that the EGR pump 32 and the air pump 22 for example may be arranged to be mechanically driven. However, for swift and accurate control of the pumps, it may be preferred that the EGR pump 32 and the air pump 22 are arranged to be electrically driven. To this end, for example one or more electrical motors may be arranged for driving the EGR pump 32 and/or the air pump 22. It will be understood that the turbocharger comprising the compressor 24 and turbine 18 may provide for the main boost pressure. As such, the electrical motors may provide sufficient power to regulate the air pump 22 and/or the EGR pump 32.

Optionally, and as in the illustrated example, the EGR pump 32 and the air pump 22 may be displacement pumps. As mentioned in the above, with displacement pump is meant herein a displacement type pump without internal compression, wherein a certain captured volume is displaced for each revolution of the pump. With displacement pumps, the desired control of the air inflow and/or EGR inflow may be obtained.

For example, and as illustrated in FIG. 2, the EGR pump 32 and/or the air pump 22 may be located immediately upstream the intake manifold 12. With "immediately" upstream is meant that no other components are arranged between the respective pump and the intake manifold, to the benefit of the responsivity of the engine system when controlling the air pump 22 and the EGR pump 32. Thus, in the example of FIG. 2, the EGR pump 32 is arranged in the EGR system 30 downstream the EGR cooler 38 and upstream the intake manifold 12. The air pump 22 is arranged in the air intake system 20 downstream the charge air cooler 28 and upstream the intake manifold 12.

That the EGR pump 32 and the air pump 22 is located immediately upstream the intake manifold 20 is advantageous also since the EGR pump 32 and the air pump 22, as outlined in the above, hinder flow from going backwards through the pumps and thus hinder backfire from the combustion engine 1.

Optionally, and as illustrated in FIG. 2, the EGR system 30 comprises a bypass path 36 bypassing the EGR pump 32. The bypass path may comprise a bypass valve 37. As such, the bypass valve 37 may be controlled so as to reduce the exhaust gas mass flow pumped by the EGR pump 32. As such, control of the exhaust gas take intake may be accomplished by controlling the EGR pump 32 and the bypass valve 37.

By virtue of the EGR pump and the air pump being arranged to be independently controllable, a precise control of the air and exhaust gas intake into the combustion engine is enabled. As such, parameters such as mass, temperature, pressure and gas composition in the cylinders of the combustion engine may be more accurately controlled, which increases the possibilities of avoiding abnormal combustion such as knock. With the increased possibilities of avoiding abnormal combustion such as knock, the combustion engine arrangement as proposed in the above may suitably be adapted to use hydrogen as fuel.

In view of the above a method for controlling a combustion engine arrangement, such as for example the combustion engine arrangement 1 illustrated in FIG. 2, is provided. The method comprises independently controlling said EGR pump 32 and said air pump 22 so as to independently control the exhaust gas inflow and the air inflow to the intake manifold 12 of the combustion engine 10.

As such, the method provides for accuracy in control of the exhaust gas inflow and air inflow with the benefits as outlined in the above.

Optionally, the method comprises determining a low air demand condition of the engine 10, and for a duration of said low air demand condition, throttling said air pump 22 while recovering energy from said air pump 22. As such, in situations when the turbocharger 18, 24 provides higher boost pressure than needed for the intake air, the air pump 22 may be used to recuperate the energy from the turbocharger 18, 24.

As such, in low air demand conditions, the air pump 22 may be used for recovering energy. Optionally, the recovered energy may be stored, for example in a battery. Alternatively, the recovered energy may be used e.g. to propel a vehicle.

Optionally, the method comprises determining a low EGR demand condition of the engine, and, for a duration of said low EGR demand condition, throttling said EGR pump 32 while recovering energy from said EGR pump 32.

As such, in low EGR demand conditions, the EGR pump 32 may be used for recovering energy. Optionally, the recovered energy may be stored, for example in a battery. Alternatively, the recovered energy may be used e.g. to propel a vehicle.

The combustion engine arrangement 10 as described in the above in relation to FIG. 2 is an example of a combustion engine arrangement 10 at which application of an air pump 22 and an EGR pump 32 being independently controllable may be applied. It will be understood that several variants of combustion engine arrangements 10 are available.

Further, the combustion engine arrangement 10 as proposed herein may be used to provide energy to a propulsion system of a vehicle alone or in combination with other engine arrangements, such as electric engine arrangements, i.e. fuel cell or battery arrangements.

It is to be understood that the present invention is not limited to the embodiments described above and illustrated in the drawings; rather, the skilled person will recognize that many changes and modifications may be made within the scope of the appended claims.

The invention claimed is:

1. A combustion engine arrangement adapted to use hydrogen as a fuel, comprising a combustion engine having an intake manifold, and an exhaust manifold,
   the combustion engine arrangement comprising:
   a turbocharged air intake system fluidly connected to said intake manifold, the turbocharged air intake system comprising an air pump; and
   an exhaust gas recirculation (EGR) system fluidly connecting said exhaust manifold to said intake manifold, the EGR system comprising an EGR pump, wherein the EGR pump and the air pump are arranged to be independently controllable so as to enable independent control of the exhaust gas inflow and the air inflow to the intake manifold of the combustion engine, and said EGR pump and said air pump are displacement pumps without internal compression, wherein a volume is displaced for each revolution of the pump, and said EGR pump and said air pump are located immediately upstream the intake manifold.

2. A combustion engine arrangement according to claim 1, wherein said combustion engine is a spark ignition combustion engine.

3. A combustion engine arrangement according to claim 1, wherein said combustion engine is a compression ignition combustion engine.

4. A combustion engine arrangement according to claim 1, wherein said combustion engine is a port injection engine.

5. A combustion engine arrangement according to claim 1, wherein said combustion engine is a direct injection engine.

6. A combustion engine arrangement according to claim 1, wherein the EGR pump and the air pump are arranged to be electrically driven.

7. A combustion engine arrangement according to claim 1, wherein the EGR pump and the air pump are arranged to be mechanically driven.

8. A combustion engine arrangement according to claim 1, wherein said EGR system comprises a bypass path bypassing the EGR pump.

9. Method for controlling a combustion engine arrangement according to claim 1, the method comprising independently controlling said EGR pump and said air pump so as to independently control the exhaust gas inflow and the air inflow to the intake manifold of the combustion engine.

10. The method according to claim 9, comprising determining a low air demand condition of the engine, and for a duration of said low air demand condition, throttling said air pump while recovering energy.

11. The method according to claim 9, comprising determining a low EGR demand condition of the engine, and, for a duration of said low EGR demand condition, throttling said EGR pump while recovering energy from said EGR pump.

12. A control unit for operating a combustion engine arrangement, wherein the control unit is configured to perform the method according to claim 9.

13. A vehicle comprising the combustion engine arrangement according to claim 1.

* * * * *